(12) United States Patent
Kamiya

(10) Patent No.: US 9,367,749 B2
(45) Date of Patent: Jun. 14, 2016

(54) OBJECT DETECTION APPARATUS

(71) Applicant: DENSO CORPORATION, Kariya, Aichi-pref. (JP)

(72) Inventor: Yasunori Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/182,444

(22) Filed: Feb. 18, 2014

(65) Prior Publication Data
US 2014/0241580 A1    Aug. 28, 2014

(30) Foreign Application Priority Data
Feb. 22, 2013    (JP) ................. 2013-033471

(51) Int. Cl.
*G06K 9/00* (2006.01)
*G06K 9/68* (2006.01)

(52) U.S. Cl.
CPC ........ *G06K 9/00791* (2013.01); *G06K 9/00832* (2013.01); *G06K 9/6807* (2013.01)

(58) Field of Classification Search
None
See application file for complete search history.

(56) References Cited

U.S. PATENT DOCUMENTS

2013/0141520 A1*   6/2013   Zhang et al. ............ 348/36

FOREIGN PATENT DOCUMENTS

| JP | H09-35197 | 2/1997 |
|---|---|---|
| JP | 2005-259031 | 9/2005 |
| JP | 2006-163726 | 6/2006 |
| JP | 2007-249841 | 9/2007 |
| JP | 2007-328630 | 12/2007 |
| JP | 2008-158673 | 7/2008 |
| JP | 2009-122859 | 6/2009 |
| JP | 2009122859 A * | 6/2009 |
| JP | 2009-237897 | 10/2009 |
| JP | 2009-295112 | 12/2009 |
| JP | 2013-008315 | 1/2013 |

OTHER PUBLICATIONS

Handmann, Uwe, et al. "An image processing system for driver assistance." Image and Vision Computing 18.5 (2000): 367-376.*
Office Action dated Jan. 6, 2015 in corresponding Japanese Application No. 2013-033471.
Dismissal of Amendment and Decision of Refusal dated Jun. 23, 2015 in corresponding Japanese Application No. 2013-033471.
Office Action dated Mar. 17, 2015 in corresponding Japanese Application No. 2013-033471.

* cited by examiner

*Primary Examiner* — Nirav G Patel
(74) *Attorney, Agent, or Firm* — Harness, Dickey & Pierce, P.L.C.

(57) ABSTRACT

An object detection apparatus mounted in a vehicle for detecting a target object in various changing environmental conditions. In the apparatus, a storage prestores plural image recognition dictionaries each describing reference data for the target object, and plural image recognition techniques each used to detect the target object from an input image with use of one of the plural image recognition dictionaries. A first acquirer acquires an operating state of a lighting device of the vehicle. A selector selects, according to the acquired operating state of the lighting device, one of the plural of image recognition dictionaries and one of the plural of image recognition techniques. A detector detects the target object in the input image by applying image recognition processing thereto with use of the selected image recognition dictionary and technique.

5 Claims, 4 Drawing Sheets

FIG.2A

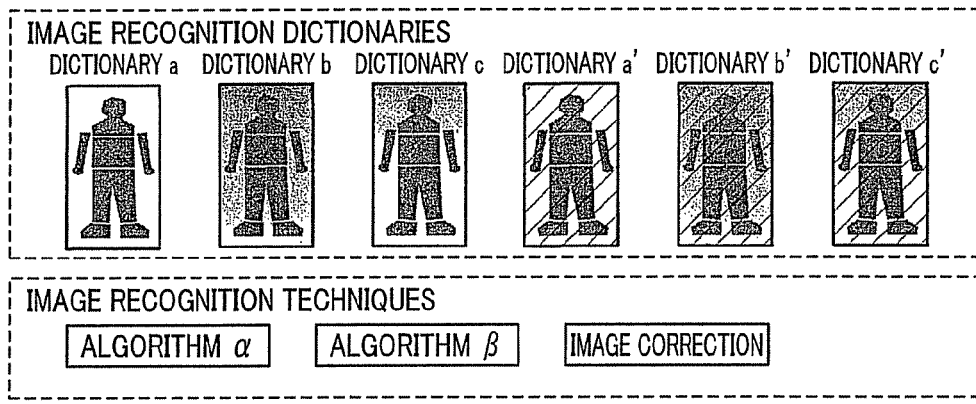

FIG.2B

|  |  | OPERATING STATES OF WIPER | | |
|---|---|---|---|---|
|  |  | OFF | LOW SPEED | HIGH SPEED |
| OPERATING STATES OF HEADLIGHTS | OFF | PATTERN A | PATTERN B | PATTERN C |
|  | LOW BEAM | PATTERN D | PATTERN E | PATTERN F |
|  | HIGH BEAM | PATTERN G | PATTERN H | PATTERN I |

PATTERN A = DICTIONARY a + ALGORITHM $\alpha$

PATTERN B = DICTIONARY a' + ALGORITHM $\alpha$

PATTERN C = DICTIONARY a' + ALGORITHM $\alpha$ + IMAGE CORRECTION

PATTERN D = DICTIONARY b + ALGORITHM $\beta$

PATTERN E = DICTIONARY b' + ALGORITHM $\beta$

PATTERN F = DICTIONARY b' + ALGORITHM $\beta$ + IMAGE CORRECTION

PATTERN G = DICTIONARY c + ALGORITHM $\beta$

PATTERN H = DICTIONARY c' + ALGORITHM $\beta$

PATTERN I = DICTIONARY c' + ALGORITHM $\beta$ + IMAGE CORRECTION

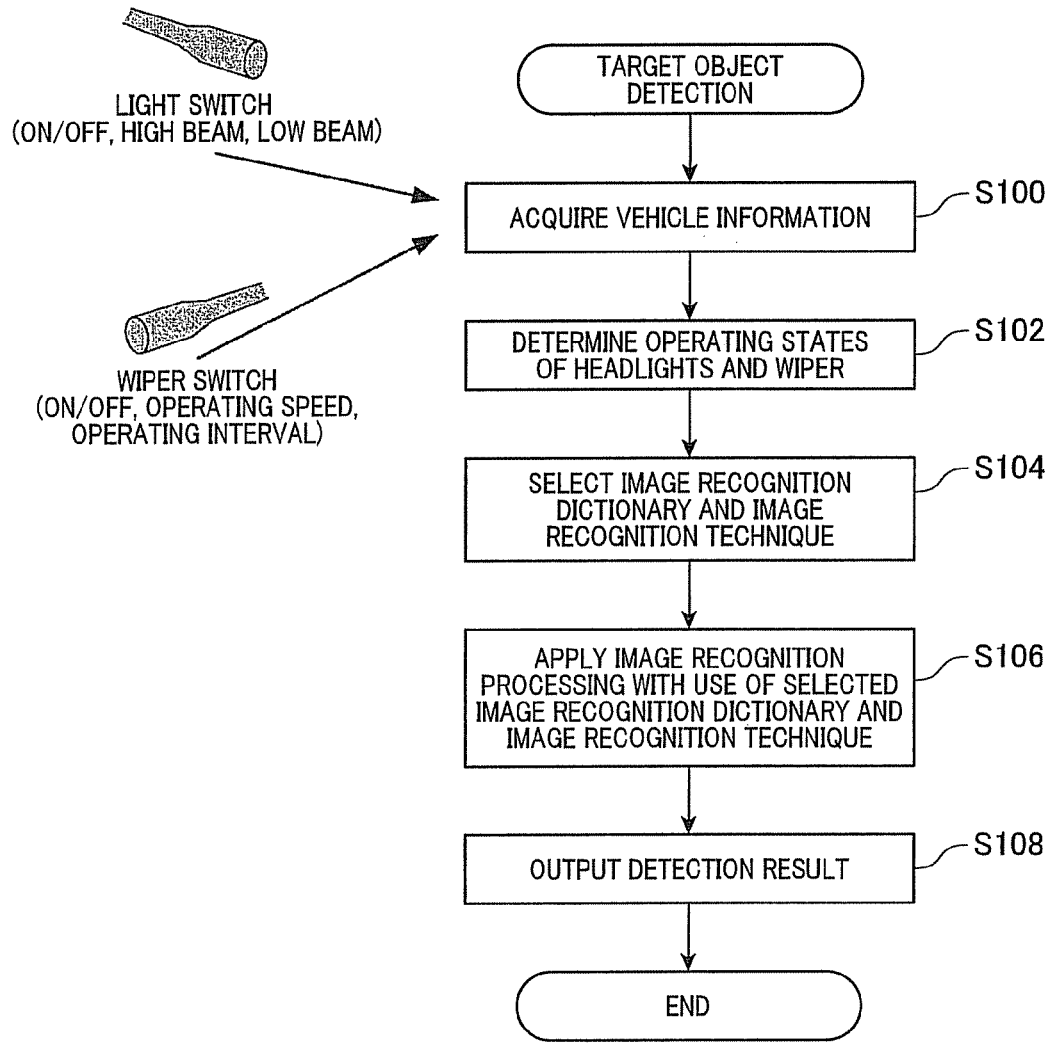

OBJECT DETECTION APPARATUS

CROSS-REFERENCE TO RELATED APPLICATION

This application is based on and claims the benefit of priority from earlier Japanese Patent Application No. 2013-33471 filed Feb. 22, 2013, the description of which is incorporated herein by reference.

BACKGROUND

1. Technical Field

The present invention relates to an object detection apparatus for detecting a target object from an input image with use of an image recognition dictionary.

2. Related Art

A known object detection apparatus for detecting a target object that is an object to be detected, such as a person or a vehicle present forward or rearward of a subject vehicle, applies a predetermined image recognition algorithm using an image recognition dictionary describing reference data for the target object to an image captured by and received from a camera or the like. For example, an object detection apparatus as disclosed in Japanese Patent Application Laid-Open Publication No. 2005-259031 recognizes the presence of a person by setting a reference pattern for recognizing the presence of a person according to external environment information, such as weather or temperature information.

The image recognition dictionary used in the image recognition of the target object is predefined for a specific assumed environmental condition. However, if an environmental condition when the image was captured is far different from the environmental condition assumed when the image recognition dictionary was predefined, robustness of the image recognition results obtained by using the image recognition dictionary will be reduced and thus performance of detecting the target object will be lowered.

In the disclosed apparatus, setting the reference pattern in response to changes in the external environment information about the weather or temperature or the like can enhance the detection performance. In such an object detection apparatus mounted in a vehicle, however, changes in environmental condition caused not only by the changes in the external environment information, but also by changes in operating state of the subject vehicle, may affect the detection performance.

The visibility of the target object is variable. For example, the whole body of a pedestrian is visibly bright in the daytime hours when headlights of the subject vehicle are off while a lower part of the body of the pedestrian is visibly bright and an upper part of the body of the pedestrian is too dark to be seen in the nighttime hours when the headlights of the subject vehicle are on. Hence stable performance of detecting the target object may not be achieved when the image recognition that uses the image recognition dictionary and the image recognition technique predefined for the specific assumed environmental condition is applied to the images captured in various changing environmental conditions around the target object caused by the different operating states of the subject vehicle including active and inactive states of the headlights of the subject vehicle.

In consideration of the foregoing, it would therefore be desirable to have an object detection apparatus mounted in a vehicle, capable of reliably detecting a target object even in various changing environmental conditions caused by changes in operating states of the vehicle.

SUMMARY

In accordance with an exemplary embodiment of the present invention, there is provided an object detection apparatus mounted in a vehicle. The apparatus includes a storage storing plural image recognition dictionaries each describing reference data for an object to be detected, and plural image recognition techniques each used to detect the object from an input image captured by an imaging unit of the vehicle with use of one of the plural image recognition dictionaries. Each of the plural image recognition techniques includes an image recognition algorithm with use of one of the plural image recognition dictionaries, and may further include image correction, in which at least one of the brightness, contrast, color, sharpness and the like of the input image is adjusted prior to application of image recognition processing to the input image.

The apparatus further includes: a first acquirer configured to acquire an operating state of a lighting device of the vehicle; a selector configured to select, according to the operating state of the lighting device acquired by the first acquirer, one of the plural image recognition dictionaries stored in the storage and one of the plural image recognition techniques stored in the storage; and a detector configured to detect the object in the input image by applying image recognition processing to the input image with use of the image recognition dictionary and the image recognition technique selected by the selector.

The object detection apparatus configured as above is capable of switching between the plural image recognition dictionaries and between the plural image recognition techniques used to detect a target object according to the operating states of the vehicle lighting devices. Preferably, for example, the object detection apparatus prestores plural image recognition dictionaries and image recognition techniques that can provide optimal performance for the respective operating states of vehicle headlights (such as on, off and the like), and selects a combination of one the image recognition dictionaries and one of the image recognition techniques corresponding to the operating states of the headlights at the time of applying image recognition processing to the input image. This can enhance performance of detecting a target object via image recognition even in various changing environmental conditions caused by the operating states of the lighting devices.

BRIEF DESCRIPTION OF THE DRAWINGS

In the accompanying drawings:

FIG. 2A shows an example of a plurality of image recognition dictionaries and a plurality of image recognition techniques;

FIG. 2B shows an example of table of selection patterns; and

FIG. 3 shows an exemplary flowchart of a target object detection process.

DESCRIPTION OF SPECIFIC EMBODIMENTS

The present invention will be described more fully hereinafter with reference to the accompanying drawings.

[System Configuration]

Figure 1A:
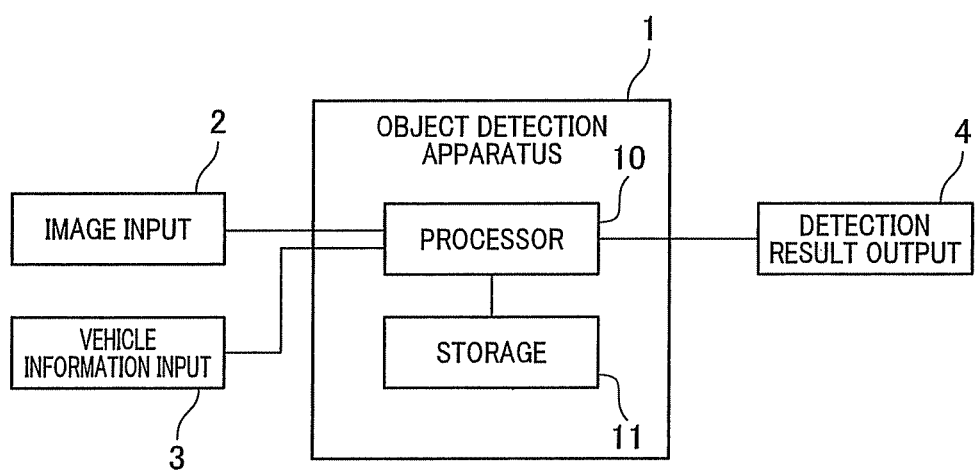
FIG. 1A shows a block diagram of an object detection system in accordance with one embodiment of the present invention.

An object detection system in accordance with one embodiment of the present invention is mounted in a vehicle (hereinafter referred to as a subject vehicle) and is used to detect a specific target object, such as a person, a vehicle, a road sign or the like present forward of the subject vehicle. As shown in FIG. 1A, the object detection system includes an object detection apparatus 1, to which an image input 2, a vehicle information input 3, a detection result output 4 and others are communicably connected.

The object detection apparatus 1 includes a processor 10 and a storage 11. The object detection apparatus 1 is configured to detect a target object image from an input image by applying image recognition processing to the input image with use of an image recognition dictionary describing the target object.

The processor 10 is an information processor including a central processing unit (CPU), a read-only memory (ROM), a random access memory (RAM), and an input/output interface and others (not shown). The processor 10 processes an input image from the image input 2 to detect a target object and outputs a detection result. The processor 10 applies well-known image recognition processing with use of an image recognition dictionary for a target object to the input image to detect a target object image therein. In the image recognition processing applied to the input image in accordance with the present embodiment, the processor 10 selects an image recognition dictionary and an image recognition technique suited for operating states of vehicle headlights and a wiper from predefined plural image recognition dictionaries and image recognition techniques. A target object recognition process of the present embodiment will be described later in more detail.

The storage 11 stores image recognition dictionaries describing reference data for a target object or target objects and computer programs associated with image recognition techniques (algorithms and image correction) with use of the image recognition dictionaries, and others. In the present embodiment, plural image recognition dictionaries predefined for different assumed environmental conditions for the same target object are prestored in the storage 11. These image recognition dictionaries are differentiated in image brightness, contrast, color, sharpness and the like depending on various changing environmental conditions caused by various operating states of the subject vehicle, such as on and off states (or active and inactive states) of the vehicle headlights, the wiper and the like of the subject vehicle.

In addition, the computer programs associated with the plural image recognition techniques different in recognition property from each other are also stored in the storage 11. The plural image recognition techniques include their respective image recognition algorithms different in recognition mechanism from each other, such as an image recognition algorithm based on similarity in geometry information between one of the image recognition dictionaries and the input image and an image recognition algorithm based on similarity in average or histogram of pixel values between one of the image recognition dictionaries and the input image. Each of the image recognition techniques may further include image correction to increase an image recognition detection rate of the image recognition algorithm, in which at least one of the brightness, contrast, color, sharpness and the like of the input image is adjusted prior to application of the image recognition algorithm to the input image.

FIG. 2A shows an example of plural image recognition dictionaries and image recognition techniques. More specifically, in FIG. 2A, the plural image recognition dictionaries include six different image recognition dictionaries a, b, c, a', b', c' predefined for their respective assumed environmental conditions, where these assumed environmental conditions are different from each other in brightness and sharpness of a target object (person) image depending on operating states of the headlights and the wiper. The plural image recognition techniques include two different recognition algorithms α, β, and image correction.

In the present embodiment, as shown in FIG. 2B, a table of selection patterns is prestored in the storage 11. Each selection pattern is associated with a combination of one of the plural image recognition dictionaries and one of the plural image recognition algorithms according to operating states of the headlights and the wiper. These selection patterns are designed by means of experiments or simulations taking into account the environmental conditions used to predefine the respective image recognition dictionaries and the recognition properties of the respective image recognition algorithms for differences in brightness and sharpness of the target object image so as to provide optimal detection performance.

By way of example, when the headlights are off (or on), the image recognition dictionaries predefined for the assumed environmental conditions where the headlights are off may be used and the image recognition algorithms that can provide optimal or favorable performance in these assumed environmental conditions may be used. Also, when the wiper is off (or on), the image recognition dictionaries predefined for the assumed environmental conditions where the wiper is off (or on) may be used and the image recognition algorithms that can provide optimal or favorable performance in these assumed environmental conditions may be used. In addition, in conditions where the sharpness of the input image is significantly reduced, for example, when the wiper is operating quickly in an intense downpour, the image correction may be applied to the input image, where the brightness, contrast, color, sharpness or the like of the input image are adjusted prior to application of the image recognition algorithms to the input image.

In the table shown in FIG. 2B, a plurality of selection patterns are predefined, where each selection pattern corresponds to a combination of one of the illuminating states (off, a low beam mode, a high beam mode) of the headlights and one of the operating states (off, a low speed mode, a high speed mode) of the wiper. Alternatively, a greater variety of selection patterns may be designed for more detailed conditions taking into account operating states of vehicle auxiliary lights, the operation speed of the wiper and the like.

Referring back to FIG. 1A, the image input 2 includes, as an imaging unit, a vehicle-mounted camera or the like to capture an image forward of the subject vehicle. The captured image is fed from the image input 2 to the processor 10 of the object detection apparatus 1 as an input image.

The vehicle information input 3 feeds to the object detection apparatus 1 various information for determining the operating states of the vehicle-mounted lighting devices (e.g., the headlights) and the windshield wiper. More specifically, the vehicle information input 3 includes, but is not limited to, a light switch which controls blinking of the lighting devices, and a wiper switch which operates the wiper.

The detection result output 4 alerts a driver of the subject vehicle of the presence of a vehicle (other than the subject vehicle) or a person, and/or controls the subject vehicle, in response to a detection result from the object detection apparatus 1. The detection result output 4 includes, but is not limited to, a controller of a vehicle driving safety system or a driving aid system.

Figure 1B:
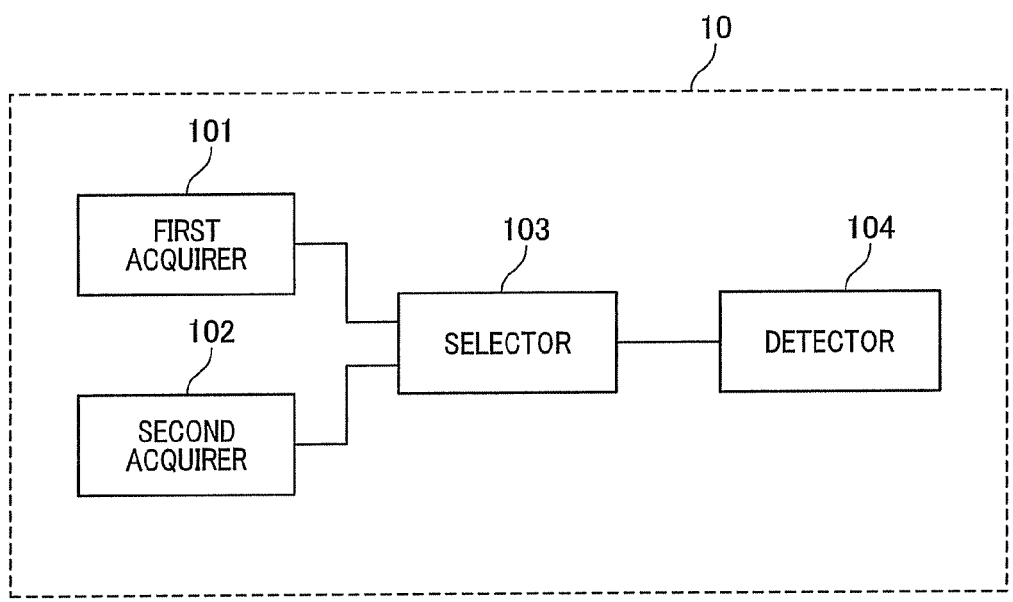
FIG. 1B shows a functional block diagram of a processor.

As shown in FIG. 1B, the processor 10 includes a first acquirer 101, a second acquirer 102, a selector 103, and a detector 104. The first acquirer 101 acquires an operating state of the lighting device (e.g., headlights) of the subject vehicle, and is responsible for execution of steps S100, S102 of a target object detection process (described later). The second acquirer 102 acquires an operating state of the wiper of the subject vehicle, and is responsible for execution of steps S100, S102 of the target object detection process. The selector 103 selects, according to the operating state of the lighting device acquired by the first acquirer 101 and the operating state of the wiper acquired by the second acquirer 102, one of the plural image recognition dictionaries stored in the storage 11 and one of the plural image recognition techniques stored in the storage 11. The selector 103 is responsible for execution of step S104 of the target object detection process. The detector 104 detects the target object in the input image by applying image recognition processing to the input image with use of the image recognition dictionary and technique selected by the selector 103. The detector 104 is responsible for execution of step S106 of the target object detection process.

[Target Object Detection Process]

The target object detection process performed in the processor 10 of the object detection apparatus 1 will now be explained with reference to a flowchart of FIG. 3.

In step S100, the processor 10 acquires, from the vehicle information input 3, vehicle information indicative of operating states of the light switch and the wiper switch. The operating states of the light switch include on, off, the low beam mode, the high beam mode, and the like. The operating states of the wiper switch include on, off, an operating speed, an operating interval, and the like.

In step S102, the processor 10 determines, on the basis of the vehicle information acquired in step S100, the operating states of the headlights and the wiper. Thereafter, in step S104, the processor 10 selects, on the basis of the operating states of the headlights and the wiper determined in step S102, the image recognition dictionary and the image recognition technique used in the image recognition processing applied to the input image from the image input 2. More specifically, the processor 10 selects one of the selection patterns corresponding to the current operating states of the headlights and the wiper with reference to the table shown in FIG. 2B to thereby determine the image recognition dictionary and the image recognition technique used in the image recognition processing.

Subsequently, in step S106, the processor 10 applies the image recognition processing to the input image from the image input 2 with use of the image recognition dictionary and the image recognition technique selected in step S104 to detect a target object in the input image. More specifically, the processor 10 scans the input image with use of the selected image recognition dictionary and applies the image recognition processing to each of predefined areas in the input image according to the image recognition algorithm of the selected image recognition technique. When the image correction is included in the selected image recognition technique, the input image is corrected prior to the application of the image recognition algorithm of the selected image recognition technique.

In step S108, the processor 10 outputs a detection result of the image recognition processing preformed in step S106 to the detection result output 4.

[Benefits]

The object detection apparatus 1 of the present embodiment can provide the following benefits.

The object detection apparatus 1 is capable of switching between the plural image recognition dictionaries and between the plural image recognition techniques used to detect a target object according to the operating states of the lighting devices (headlights) and the wiper. More specifically, the object detection apparatus 1 prestores plural image recognition dictionaries and image recognition techniques that can provide optimal performance for the respective operating states of the headlights and the wiper, and selects a combination of one the image recognition dictionaries and one of the image recognition techniques corresponding to the operating states of the headlights and the wiper at the time of applying the image recognition processing to the input image. This can enhance performance of detecting a target object via image recognition even in various changing environmental conditions caused by the operating states of the lighting devices (headlights) and the wiper.

[Modifications]

In the above embodiment, the object detection apparatus is configured such that plural selectable image recognition dictionaries and plural selectable image recognition techniques are prestored in the apparatus. Alternatively, the object detection apparatus may be configured such that plural selectable image recognition dictionaries and only one fixed image recognition technique are prestored in the apparatus, or may be configured such that only one fixed image recognition dictionary and plural selectable image recognition techniques are prestored in the apparatus.

In the above embodiment, for illustrative purposes, the operating states of the lighting devices that are taken into account to select a combination of one of the image recognition dictionaries and one of the image recognition algorithms that can provide optimal detection performance are limited to the illuminating states of the headlights. Alternatively, the operating states of the lighting devices that are taken into account to select a combination of one of the image recognition dictionaries and one of the image recognition algorithms that can provide optimal detection performance may include, besides the illuminating states of the headlights, illuminating states of auxiliary lights, such as vehicle side lights, fog lights or the like, or may further include levelling states of the headlights.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An object detection apparatus mounted in a vehicle, the object detection apparatus comprising:

a storage storing plural image recognition dictionaries each describing reference data for an object to be detected, and plural image recognition techniques each used to detect the object from an input image captured by an imaging unit of the vehicle with use of one of the plural image recognition dictionaries, each of the plural image recognition techniques including a different image recognition algorithm different in a recognition mechanism;

a first acquirer configured to acquire an operating state of a lighting device of the vehicle;

a selector configured to select, according to the operating state of the lighting device acquired by the first acquirer, one of the plural image recognition dictionaries stored in the storage and one of the plural image recognition techniques stored in the storage;

a detector configured to detect the object in the input image by applying image recognition processing to the input image with use of the image recognition dictionary and the image recognition technique selected by the selector; wherein the plural image recognition dictionaries are differentiated in image brightness, contrast, color and sharpness depending on environmental conditions caused by the operating state of the lighting device of the vehicle; and each of the plural image recognition techniques include image correction in which at least one of the brightness, the contrast, the color and the sharpness of the input image is adjusted prior to application of the image recognition algorithm.

2. The apparatus of claim 1, further comprising a second acquirer configured to acquire an operating state of a wiper of the vehicle, wherein the selector is further configured to select, according to the operating state of the lighting device acquired by the first acquirer and the operating state of the wiper acquired by the second acquirer, one of the plural image recognition dictionaries stored in the storage and one of the plural image recognition techniques stored in the storage.

3. The apparatus of claim 1, wherein each of the plural image recognition techniques comprises a respective image recognition algorithm used to apply the image recognition processing to the input image.

4. The apparatus of claim 3, wherein at least one of the plural image recognition techniques further comprises image correction applied to the input image prior to application of the image recognition algorithm to the input image.

5. The apparatus of claim 1, wherein the different image recognition algorithms include a respective image recognition algorithm based on a similarity in geometry information between each of the image recognition dictionaries and the input image and an image recognition algorithm based on a similarity in average or histogram of pixel values between each of the image recognition dictionaries and the input image.

* * * * *